No. 721,170. PATENTED FEB. 24, 1903.
J. G. FINLEY.
CLOD CRUSHER.
APPLICATION FILED SEPT. 27, 1902.
NO MODEL.

Witnesses
Jos. H. Blackwood
C. H. Randolph, Jr.

Inventor
John G. Finley
by D. A. Gourick
Attorney

UNITED STATES PATENT OFFICE.

JOHN G. FINLEY, OF DECATUR, ALABAMA.

CLOD-CRUSHER.

SPECIFICATION forming part of Letters Patent No. 721,170, dated February 24, 1903.

Application filed September 27, 1902. Serial No. 125,066. (No model.)

*To all whom it may concern:*

Be it known that I, JOHN G. FINLEY, a citizen of the United States, residing at Decatur, in the county of Morgan and State of Alabama, have invented certain new and useful Improvements in Clod-Crushers, of which the following is a specification.

My invention relates to machines for rolling fallow land, and has for its objects to provide a frame having a series of wheels journaled therein, the said wheels being provided with rims having a face suited to the ground that is to be treated, which might be flat or at any desired angle, and hubs which extend outward a fraction of an inch beyond the plane of the edges of said rim, so that when the wheels are arranged in a series on a shaft the wheels are spaced apart from one another to permit them to cut into the soil, and thus add greatly to its efficiency, as also to permit any particles of earth that may be caught between the wheels to work out again.

The advantages of my invention will more fully appear hereinafter and by reference to the accompanying drawings, in which—

Figure 1:
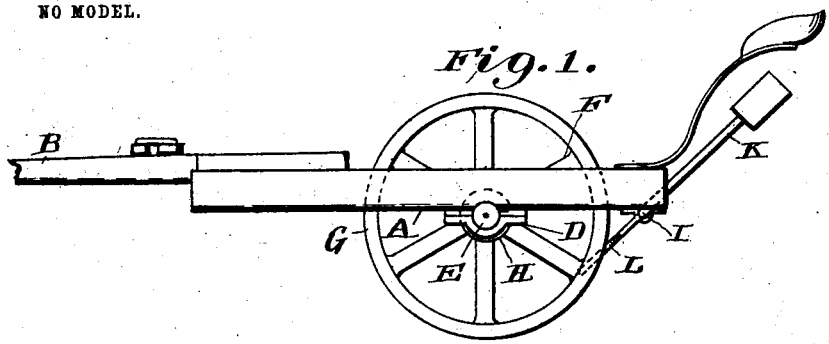
Figure 2:
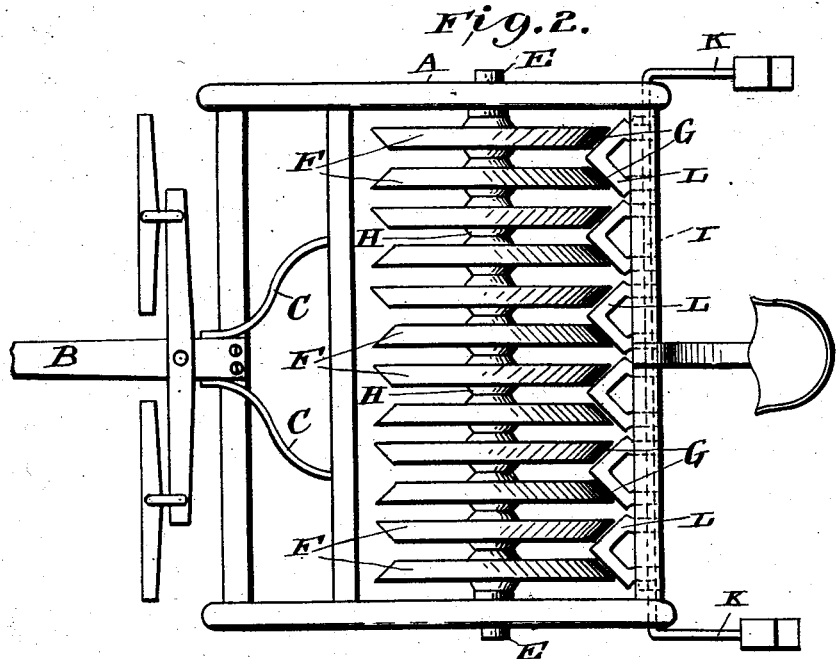

Figure 1 is a side view in elevation of my invention; Fig. 2, a top plan view, and Figs. 3, 4, and 5 views in section of different types of wheels that may be used with the machine.

Referring to the drawings, in which similar reference characters indicate corresponding parts throughout the several views, A represents the frame of my machine, which, as shown, is made preferably of a rectangular shape, and B is a draft-pole secured to said frame directly and by means of angle-braces C.

D represents boxes secured on each side beam of the frame A, in which is journaled a shaft E, the journal-boxes D being of a type that will permit removal of shaft E for the purpose hereinafter specified.

Figure 3:
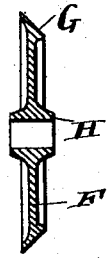
Figure 4:
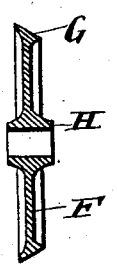
Figure 5:

F represents crushing-wheels, which are preferably made of the spoke-and-rim type to conduce to lightness in draft, the rim G of which is beveled at a greater or less angle, as shown in Figs. 3 and 4, or flat, as shown in Fig. 5, the purpose being to furnish with each complete machine a set of the several forms of wheels, so that the operator may select the style of wheels best suited for the work in which the machine might be engaged. The wheels F are loosely mounted on the shaft E, so that each rotates independently of the others, as well as collectively with said shaft E, which, as above stated, is journaled in boxes D. It will also be understood that the wheels with the angle-rims may be so arranged that the pitches of the rims are toward each other or V-shaped, as shown in Fig. 1, or so that the pitch is in the same direction or on parallel planes, as best suited to the work to be performed. The hubs H of the wheels are made longer than the width of the rim G, so that the wheels when placed on the shaft are spaced apart. This structure allows the wheels to sink into the soil and cut through large clods, thus more thoroughly performing the work, as well as permitting any particles of earth that may be caught up by the wheels to find ready egress.

I represents a rod pivotally secured on the rear beam of frame A, having weighted angular extensions K, and L scraper-blades removably secured thereto for cleaning the rims of wheels F, it being readily understood that the scraper-blades L must be shaped to fit the angle of the rims G of the wheels when arranged with pitch toward each other or on parallel planes, as above described, and also wheels of varying pitch, the blades suited for the different rims and arrangements of wheels being supplied with the machine and being transferable on rod I by any suitable means.

Having thus described my invention, what I claim is—

In a clod-crusher, the combination of a suitable frame, a shaft journaled thereon, crusher-wheels journaled on said shaft, each of said wheels having its rim beveled in a single direction and having hubs longer than the width of said rim, a rod pivoted on said frame having weighted angular extensions, and interchangeable scraper-blades removably and replaceably secured to said rod having their edges formed to fit the beveled rim of the wheels, substantially as shown and described.

In testimony whereof I hereto affix my signature in the presence of two witnesses.

JOHN G. FINLEY.

Witnesses:
W. W. CALLAHAN,
A. J. HARRIS.